United States Patent Office  
3,642,636  
Patented Feb. 15, 1972

3,642,636
LUBRICATING OIL CONTAINING PARA-t-BUTYL-ALPHA-METHYLSTYRENE POLYMERS
Robert Bacskai, Kensington, Calif., assignor to Chevron Research Company, San Francisco, Calif.
No Drawing. Filed Dec. 18, 1969, Ser. No. 886,382
Int. Cl. C10m 1/18
U.S. Cl. 252—59                                3 Claims

ABSTRACT OF THE DISCLOSURE

High molecular weight homopolymers of t-butyl-alpha-methylstyrene and lubricating oil containing them.

BACKGROUND OF THE INVENTION

This invention relates to novel high molecular weight homopolymers of para-t-butyl-alpha-methylstyrene and lubricating oils containing them as viscosity index improvers.

High molecular weight hydrocarbon polymers are useful in a variety of applications. They are widely used as thickeners in surface coating compositions such as paint and the like. They are also used as thickeners for fuel compositions or as viscosity index improvers in lubricating oil compositions.

Polymers of t-butylstyrene have recently been suggested as viscosity index improvers as illustrated by U.S. Pat. 3,318,813 issued May 9, 1967 to McCormick and Nummy.

SUMMARY OF THE INVENTION

It has now been found that homopolymers of para-t-butyl-alpha-methylstyrene having an average molecular weight as determined by standard light-scattering measurements in a range of from about 20,000 to about 1,000,000 and a solubility in mineral lubricating oil of at least about 0.1% by weight are unusually effective as thickening agents and, more specifically, as viscosity index improvers in oils of lubricating viscosity.

DESCRIPTION OF THE PREFERRED EMBODIMENTS

The synthesis of para-t-butyl-alpha-methylstyrene is carried out in accordance with the following scheme:

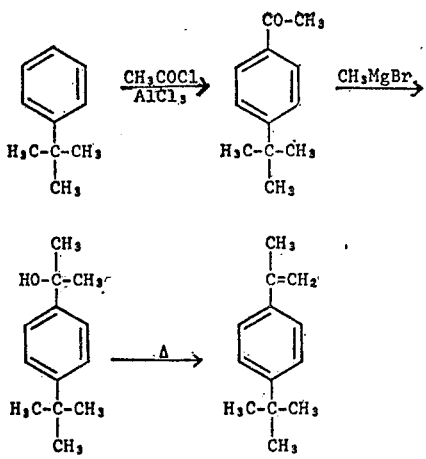

The above preparation of the intermediate para-t-butylacetophenone is achieved with 95% purity by the method of Butler, Ferstandig and Clark reported in the Journal of the American Chemical Society, vol. 76, page 1906, in 1954. Using the method of Hermans, Knaeps and Van der Eycken reported in Chemical Abstracts, vol. 54, page 7592h, in 1960, the acetophenone is converted to the carbinol, which is then dehydrated to yield the para-t-butyl-alpha-methylstyrene in 98% purity.

The para-t-butyl-alpha-methylstyrene is polymerized readily with cationic or anionic catalysts of known types. Solvents are used in the reaction to facilitate mixing and handling where desired. Pressure and temperature of the reaction are not critical but cooling is generally desirable to control the rate of polymerization.

The homopolymers of para-t-butyl-alpha-methylstyrene of the invention have average molecular weights of at least about 20,000 as determined by standard light-scattering methods. For persent purposes the preferred polymers have average molecular weights in the range of from about 50,000 to about 1,000,000 and a solubility in mineral lubricating oil of at least about 0.1% by weight.

The following examples are further illustrative of the homopolymers of para-t-butyl-alpha-methylstyrene according to this invention. Unless otherwise specified, the proportions in the illustrative examples are on a weight basis.

EXAMPLE I

In this example the polymer of para-t-butyl-alpha-methylstyrene was prepared by cationic polymerization. Into a 200 ml., 3-necked flask there was introduced 60 ml. of $CH_2Cl_2$ and 10 g. of p-tert-butyl-$\alpha$-methylstyrene. The flask was equipped with thermometer, drying tube, and a side arm for the introduction of catalyst. The reaction mixture was cooled to $-78°$ C., and 0.36 g. of $BF_3 \cdot Et_2O$ was added dropwise in 25 minutes. The reaction mixture became viscous, and polymer precipitated. After maintaining the reaction mixture at $-78°$ C. for an additional 35 minutes, a few drops of methanol were added. The contents of the flask were poured into 500 ml. of methanol, and the precipitate was filtered and subsequently dried at 70° C. in vacuum.

Yield: 9.60 g. (96% of theory)
Specific viscosity: $\eta sp./c.=0.56$ (25° C., $C_6H_6$, 0.1 g./100 ml.)

EXAMPLE II

For purpose of comparison the polymer of alpha-methylstyrene was prepared employing the cationic polymerization procedure of Example I.

Yield: 9.81 g. (98.1% of theory).
Specific viscosity: $\eta sp./c.=1.05$ (25° C., $C_6H_6$, 0.1 g./100 ml.).

EXAMPLE III

In this example the polymer of para-t-butyl-alphamethylstyrene was prepared by anionic polymerization. This polymer was prepared by a method developed for the polymerization of alpha-methylstyrene by Braun, Heufer, Johnsen and Kolbe, Bunsen Ges. Phys. Chem. Ber., Vol. 68, page 959, 1964. The catalyst used was prepared by melting together, in a nitrogen atmosphere, 2.71 g. potassium and 1.36 g. sodium in 100 ml. n-heptane.

A 3-necked, 250 ml. flask equipped with stirrer, thermometer, $N_2$ inlet tube, and drying tube was charged with 9.80 g. of freshly distilled p-tert-butyl-alpha-methylstyrene and 50 ml. of tetrahydrofuran (distilled over $LiAlH_4$). The solution was purged with nitrogen, cooled down to $-78°$ C.; and 0.31 g. of the liquid K/Na alloy was added. The reaction mixture was stirred at $-78°$ C. for two hours. During that time, the solution turned deep red. The red color is characteristic for the "living" styryl anion. The reaction was terminated by the addition of a few drops of methanol which decolorized the solution. The unreacted catalyst was destroyed carefully with more methanol, and the reaction mixture was poured into a solution of 500 ml. of methanol and 5 ml. of concentrated HCl. The precipitated polymer was filtered, washed with methanol, and dried at 70° C.

Yield: 7.37 g. (75.2% of theory)

Specific viscosity: $\eta sp./c.=0.08$ (25° C., $C_6H_6$, 0.1 g./100 ml.)

EXAMPLE IV

In this example the polymer of alpha-methylstyrene produced by anionic polymerization was prepared for comparative purposes.

Yield: 9.74 g. (96.8% of theory)

Specific viscosity: $\eta sp./c.=0.22$ (25° C., $C_6H_6$, 0.1 g./100 ml.)

The polymers of para-t-butyl-alpha-methylstyrene of this invention are oil soluble. This is intended to mean they are soluble in conventional mineral oils and other oil compositions in a concentration of at least about 0.1% by weight based on the total composition.

In the lubricating oil compositions of this invention the para-t-butyl-alpha-methylstyrene polymer is used with lubricating oil base in an amount sufficient to raise the viscosity index of the base lubricating oil. Ordinarily amounts of the polymer of from about 0.1% to about 15% by weight are satisfactory for this purpose. In view of the excellent solubility characteristics of the polymer, a further feature of the invention lies in the preparation of lubricating oil concentrates containing percentages of polymers of up to about 75% by weight.

The base oil in the lubricant composition of the invention is any oil of lubricating viscosity. Thus, the base oil can be a refined paraffin-type base oil, a refined naphthenic-type base oil, or a synthetic hydrocarbon or synthetic non-hydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethyl-hexyl)-sebacate, tricresylphosphate and silicate esters, such as tetra - (2-ethylhexyl)orthosilicate and hexa - (2-ethylbutoxy)-disiloxane. For present purposes the mineral lubricating oils are preferred, since they show the greatest viscosity and stability improvement.

Lubricant compositions within the scope of the present invention may also contain still other additives of conventional types, such as pour point depressants, oiliness and extreme pressure agents, anti-oxidants, blooming agents and the like. Other types of detergents, such as metal salts, may also be employed where ash formation is not a problem.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$, and the bivalent metal dihydrocarbon dithiophosphates, zinc butyl amyl dithiophosphate and zinc di-(tetradecylphenyl)dithiophosphate. Metal salt detergents in amounts from about 0.1 to 10% which may also be used are the calcium petroleum sulfonates of the oil soluble mahogany type and the calcium naphthenates.

The outstanding characteristics of the lubricating oil composition containing the polymer in accordance with this invention are shown in various tests. In these tests the viscosities of the compositions are determined and the viscosity index calculated by the Standard ASTM Method D567-41.

In the tests, 2.8% by weight of the polymer is dissolved in 130 Neutral Oil, which is a California paraffin base oil having a viscosity of 130 SSU at 100° F. This base oil ordinarily has a viscosity index of 89.

The tests of the polymer of para-t-butyl-alpha-methylstyrene in comparison with para-t-butylstyrene are reported in the following table:

TABLE

| | RPM 130 Neutral | Polymer of para-t-butyl-styrene | Polymer of para-t-butyl-A-methyl-styrene |
|---|---|---|---|
| Oxidizability | 2.71 | 2.51 | 2.34 |
| Viscosity: | | | |
| Before oxidation: | | | |
| Viscosity, 100° F., SUS | 130.8 | 386.1 | 341.7 |
| Viscosity, 210° F., SUS | 41.53 | 71.09 | 62.9 |
| V.I. | 89 | 140 | 133 |
| After oxidation: | | | |
| Viscosity, 100° F., SUS | 169 | 317.2 | 344.7 |
| Viscosity, 210° F., SUS | 43.55 | 58.96 | 60.85 |
| V.I. | 80 | 127 | 126 |

In the above test results the oxidazability was obtained by passing oxygen through a 2.8% polymer solution in 130 Neutral Oil at 340° F. with the amount given indicating liters of oxygen per 100 grams of oil absorbed in 64 hours. The viscosities were determined in terms of Saybolt Universal Seconds at the specified temperature.

The test results show that the polymers of para-t-butyl-alpha-methylstyrene in accordance with the present invention possess surprisingly stable viscosity index improving properties. Although the analogous para-t-butylstyrene provides viscosity index improvement, it is by no means as stable as the polymer of para-t-butyl-alpha-methylstyrene when subjected to oxidation as normally occurs in actual lubricating oil service.

The fact that the para-t-butyl-alpha-methylstyrene polymer of the invention is better than the analogous polymer of t-butylstyrene as viscosity index improver apparently resides in the alpha methyl group. However, this effect is an unexpected one since the analogous alpha-methylstyrene polymer is insoluble in lubricating oil.

As will be evident to those skilled in the art, various modifications on this invention can be made or followed, in the light of the foregoing disclosure and discussion, without departing from the spirit or scope of the disclosure or from the scope of the following claims.

What is claimed is:

1. A lubricating oil composition comprising a major proportion of mineral lubricating oil and a minor proportion sufficient to raise the viscosity index thereof of the polymer of t-butyl-α-methylstyrene having an average molecular weight as determined by standard light-scattering measurements in the range of from about 20,000 to about 1,000,000 and a solubility in mineral lubricating oil of at least about 0.1% by weight.

2. A lubricating oil composition comprising a major proportion of mineral lubricating oil and from about 0.1 to about 15% by weight of the polymer of claim 1.

3. A lubricating oil concentrate comprising mineral lubricating oil and from about 15 to about 75% by weight of the polymer claim 1.

References Cited

UNITED STATES PATENTS

| 2,967,827 | 1/1961 | Bolt et al. | 252—59 X |
| 2,982,730 | 5/1961 | Barry | 252—59 |
| 3,318,813 | 5/1962 | McCormick et al. | 252—59 |
| 3,385,905 | 5/1968 | Smith et al. | 252—59 X |

DANIEL E. WYMAN, Primary Examiner

W. H. CANNON, Assistant Examiner

U.S. Cl. X.R.

260—93.5 R